United States Patent
Boroel et al.

(10) Patent No.: US 9,278,656 B2
(45) Date of Patent: Mar. 8, 2016

(54) PROTECTION SHIELD FOR VEHICLE HEADLINER

(71) Applicant: Toyota Motor Engineering & Manufacturing North America, Inc., Erlanger, KY (US)

(72) Inventors: Araceli Boroel, Ann Arbor, MI (US); Carl David Spamer, Brighton, MI (US); Robert C. Steinbrecher, Dexter, MI (US)

(*) Notice: Subject to any disclaimer, the term of this patent is extended or adjusted under 35 U.S.C. 154(b) by 0 days.

(21) Appl. No.: 14/272,328

(22) Filed: May 7, 2014

(65) Prior Publication Data
US 2015/0321623 A1 Nov. 12, 2015

(51) Int. Cl.
*B60R 13/02* (2006.01)
*B60R 21/231* (2011.01)
*B60R 21/232* (2011.01)

(52) U.S. Cl.
CPC ............ *B60R 13/0212* (2013.01); *B60R 21/232* (2013.01); *B60R 21/23138* (2013.01); *B60R 2013/0287* (2013.01)

(58) Field of Classification Search
CPC .............. B60R 13/0212; B60R 21/232; B60R 21/23138; B60R 2013/0287; B60R 21/214; B60H 1/3421; B60H 2001/3471
See application file for complete search history.

(56) References Cited

U.S. PATENT DOCUMENTS

| | | | |
|---|---|---|---|
| 6,120,090 A | 9/2000 | Byma et al. | |
| 6,431,584 B1* | 8/2002 | Nagasawa et al. | 280/728.2 |
| 6,761,374 B2* | 7/2004 | Di Sante et al. | 280/728.2 |
| 7,255,391 B2 | 8/2007 | Bristow et al. | |
| 7,744,120 B2 | 6/2010 | Rust et al. | |
| 7,762,574 B1* | 7/2010 | Spamer et al. | 280/728.2 |
| 7,914,035 B2* | 3/2011 | Davey et al. | 280/728.2 |
| 7,914,036 B2* | 3/2011 | Spamer et al. | 280/728.2 |
| 8,925,960 B2* | 1/2015 | Uchida | 280/730.2 |
| 2008/0061604 A1* | 3/2008 | Tiesler et al. | 296/214 |
| 2011/0028077 A1* | 2/2011 | Ludwig et al. | 454/143 |

* cited by examiner

*Primary Examiner* — Ruth Ilan
*Assistant Examiner* — Timothy Wilhelm

(57) ABSTRACT

Airbag protection shields are disclosed that comprise an inner surface and an outer surface, wherein the shield is configured to attach to a vehicle headliner assembly and cover a portion of at least one vehicle component in the headliner assembly, the at least one vehicle component being positioned such that a nearby airbag may contact the at least one vehicle component upon deployment. The protection shields may be configured to protect a headliner assembling containing air ducts and air vents.

11 Claims, 3 Drawing Sheets

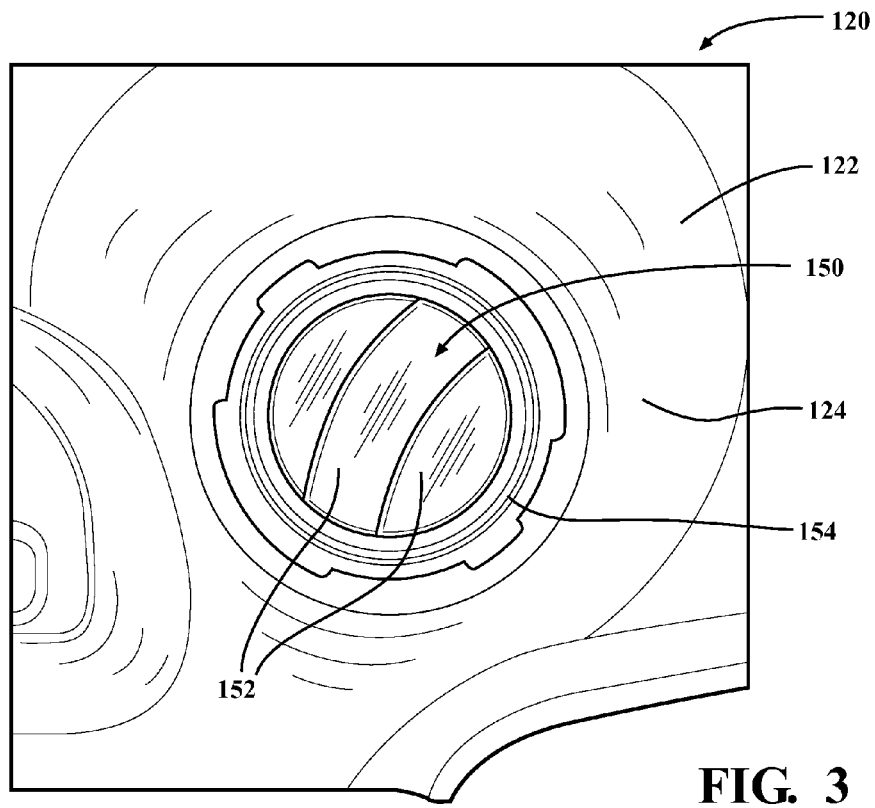
FIG. 3
FIG. 4
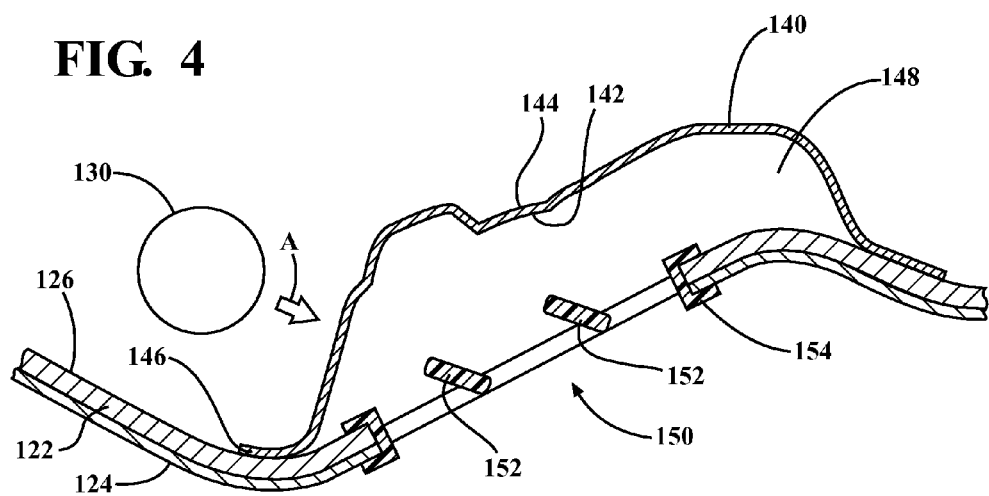

PROTECTION SHIELD FOR VEHICLE HEADLINER

BACKGROUND OF THE DISCLOSURE

The present disclosure relates generally to protective shields for use in vehicles and, more particularly, to protective shields for vehicle headliners near side curtain airbags.

Airbag modules have become common in modern vehicles. An airbag module typically includes an inflatable airbag and an inflator. Side curtain airbags may be incorporated in the sides of the interior of vehicles and may deploy from an area near the headliner of a vehicle. In response to an activation event, a sensor activates the inflator to generate an inflation gas that rapidly inflates the inflatable airbag to facilitate protection of an occupant. Headliners routinely include sensitive components that may be damaged or come apart if impacted during an airbag deployment.

SUMMARY OF THE DISCLOSURE

Embodiments of shields for protecting vehicle components near airbags are described herein. Protective shields may be incorporated into a headliner assembly of a vehicle and may be configured to cover vehicle components such as air ducts and vents. The protective shield may prevent airbag deployment forces from damaging vehicle components or causing parts of the components to be projected into the interior of the vehicle.

In one implementation, a vehicle headliner assembly comprises a headliner having a first side and a second side, an air duct having an inner duct surface and outer duct surface, wherein a portion of the inner duct surface is attached to the second side of the headliner creating a cavity between in the inner duct surface and headliner, and a protection shield having an inner surface and outer surface, wherein a portion of the inner surface is attached in abutment to the outer duct surface of the air duct.

In another implementation, a vehicle headliner assembly comprises a headliner having a first side and a second side, at least one air duct having an inner duct surface and outer duct surface, wherein a portion of the inner duct surface is attached to the second side of the headliner creating a cavity between the inner duct surface and headliner, and a protection shield having an inner surface and outer surface, wherein a portion of the inner surface is attached in abutment to the outer duct surface of the air duct and the inner surface of the protection shield is formed in substantially the same shape as the outer duct surface; and a side curtain airbag disposed proximate to the protection shield.

In yet another implementation, an airbag protection shield comprises an inner surface and an outer surface, wherein the shield is configured to attach to a vehicle headliner assembly such that the shield is positioned between a portion of at least one vehicle component in the headliner assembly and an airbag assembly while in an attached position.

The foregoing features and elements may be combined in various combinations without exclusivity unless expressly indicated otherwise. These features and elements as well as the operation thereof will become more apparent in light of the following description and the accompanying drawings. It should be appreciated, however, that the following description and drawings are intended to be exemplary in natures and non-limiting.

BRIEF DESCRIPTION OF THE DRAWINGS

The description makes reference to the accompanying drawings wherein like reference numerals refer to like parts throughout the several views, and wherein:

FIG. 3 shows a perspective view of a vent located in the headliner assembly of FIG. 2;

FIG. 4 shows a cross sectional view of the headliner assembly of FIG. 2 along view 4-4 with a side curtain airbag in a folded condition;

DETAILED DESCRIPTION

Protective shields are described herein that may protect sensitive vehicle components from forces upon airbag deployment. Protective shields may be included in headliner assemblies that cover components and redirect airbag deployment forces. While it is contemplated that such shields may be utilized to protect a variety of sensitive vehicle components, the disclosure may be described with respect to embodiments protecting air ducts and air vents within headliner assemblies. The protective shields may be attached directly to a headliner or vehicle component and may prevent damage to the components.

Figure 1:
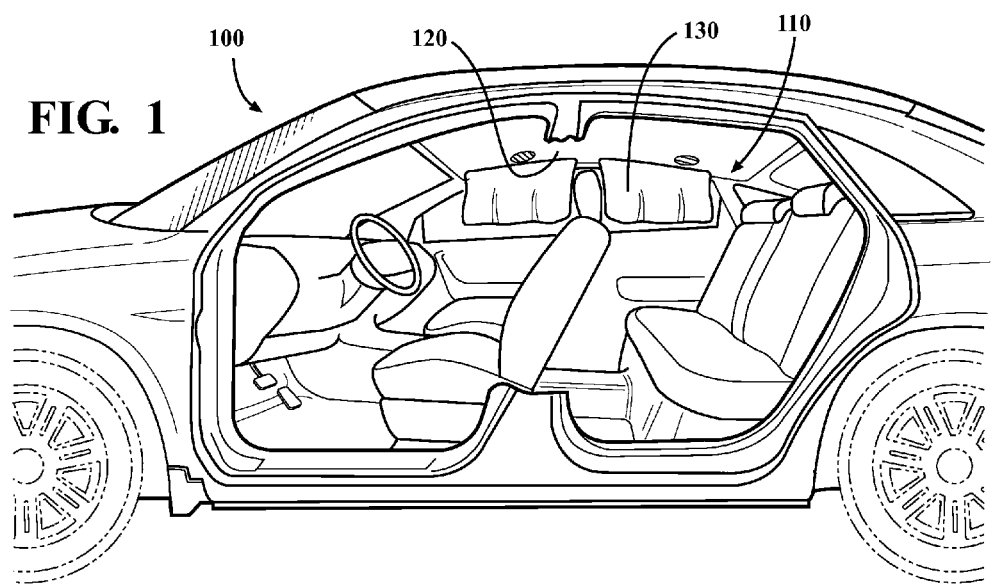
FIG. 1 shows a partial perspective view of a vehicle interior with a side curtain airbag in a deployed condition.

FIG. 1 shows a perspective view of a partial vehicle 100 with interior 110, headliner assembly 120, and side curtain airbags 130. Headliner assembly 120 may be installed near the top of the interior 110 above potential occupants in vehicle 100. Headliner assembly 120 may span the entirety or any portion of the interior 110 above occupants. Vehicle 100 may also include side curtain airbags 130 to protect occupants in the event of a crash or rollover. Vehicle 100 is shown to be a sedan automobile, but vehicle 100 may be any vehicle configured to transport passengers.

Figure 2:
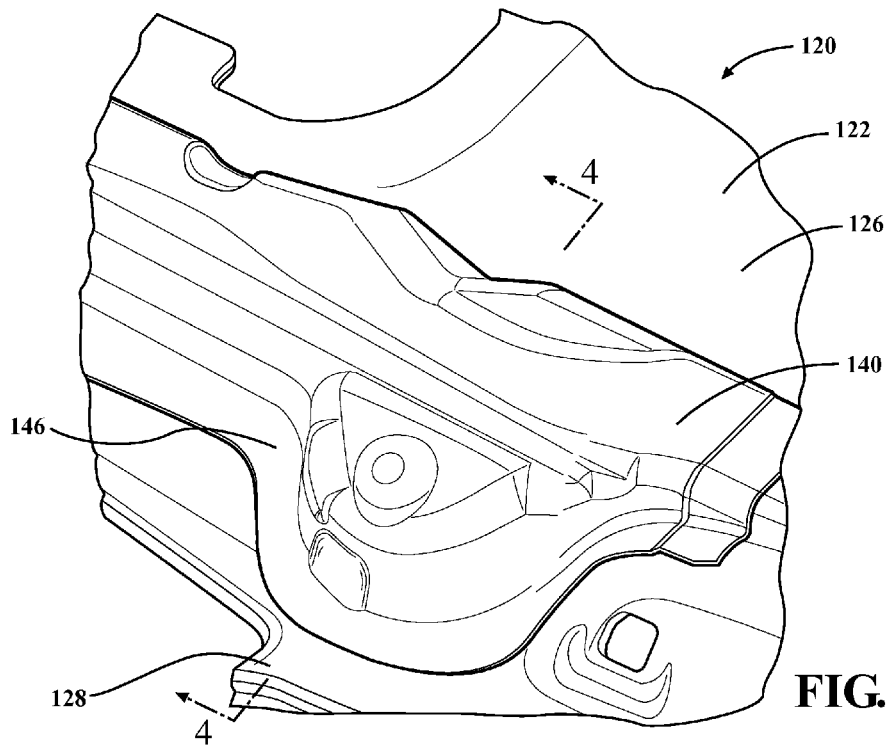
FIG. 2 shows a perspective view of a portion of an outer side of a headliner assembly.

In some embodiments, headliner assembly 120 may include headliner 122. Referring to FIGS. 2 and 4, headliner 122 may include inner surface 124 and outer surface 126. Inner surface 124 may be the surface that faces towards occupants in the interior 110 of vehicle 100. Outer surface 126 may oppose inner surface 124 and face the roof of vehicle 100 when the headliner is installed. Headliner 122 may comprise one sheet of material or may include distinct layers of differing properties. For example, headliner 122 may include a semi-rigid backing material of plastic, polymers, and/or fibrous material that includes outside surface 126. Headliner 122 may include a layer of decorative material that includes inner surface 124. Outer surface 126 may be configured to include mounting structure to allow for headliner 122 to be attached to vehicle 100 or additional vehicle components.

With continued reference to FIG. 1, airbags 130 may be configured to inflate to a deployed condition wherein airbags 130 may extend downward near the sides of vehicle 100. Deployed airbags 130 may cushion impact of occupants against the side portion of vehicle 100. Airbags 130 may be stored in a deflated condition (see FIGS. 4 and 6) and may be inflated to a deployed condition shown in FIG. 1. Upon an activation event, vehicle sensors may signal airbag inflators to rapidly inflate airbags 130. For example, airbags 130 may be deployed during activation events such as a vehicle crash. Airbags 130 may be attached to headliner assembly 120 or portions of the vehicle 100 near a side edge 128 of headliner assembly 120. Due to rapid inflation, airbag 130 may impact and exert forces on surrounding vehicle components. In some embodiments, airbags 130 may be configured to impact and partially detach headliner 122 from vehicle 100 to deploy between headliner 122 and other portions of vehicle 100. Airbags 130 may also be configured to push through and tear headliner 122.

In some embodiments, headliner assembly 120 may include a variety of vehicle components. Some vehicle components may include, for example, heating and cooling systems, electronics and wiring components, lights, and other safety components. In the exemplary embodiments of FIGS. 2 and 4, headliner assembly 120 may include air duct 140 to facilitate the movement of air throughout interior 110 of vehicle 100. Duct 140 may include an inner duct surface 142 and an outer duct surface 144. Duct 140 may be configured to attach to headliner 122 to create a duct cavity 148 between inner duct surface 142 and headliner 122. Duct 140 may include duct flange 146 that is attached to outer surface 126 of headliner 122. In some embodiments, duct 140 may be made out of a lightweight material to reduce cost and weight to vehicle 100. For example, duct 140 may be comprised of thin sheet metal that may deform under substantial force.

FIG. 3 shows a perspective view of a portion of headliner assembly 120 with a vent 150. In some embodiments, vent 150 may be an aperture defined in headliner 122. As shown in FIGS. 3 and 4, vent 150 may include a plurality of vanes 152 and a vent attachment 154. Vent attachment 154 may include a channel that captures headliner 122 when vent 150 is installed in headliner assembly 120. Components of vent 150 may be made from a variety of materials such as polymer and metal. In addition to duct 140 and vent 150, headliner assembly 120 may include or be installed proximate to a variety of sensitive components such as electronics, safety features, and lights.

FIG. 4 shows a cross sectional view of the headliner assembly 120 along view 4-4 with a side curtain airbag 130 in a folded condition. Airbag 130 is shown folded in a rounded cross section in FIG. 4, but it is contemplated that several folding patterns may be utilized. Due to the configuration of headliner assembly 120, the airbag 130 may be located near sensitive vehicle components such as duct 140 and vent 150. Upon an activation event, airbag 130 may be rapidly inflated and the inflation of airbag 130 may cause airbag 130 to expand in a radial direction from the center of airbag 130. This may result in a deployment force applied to headliner 122 or any component nearby such as duct 140. For example, force A as shown in FIG. 4 may be applied to duct 140. Force A, in some situations, may cause damage to duct 140 and vent 150. For example, force A may cause duct 140 to substantially deform and impact vent 150 causing portions of vent 150 to be projected into interior 110 of vehicle 100.

Figure 5:
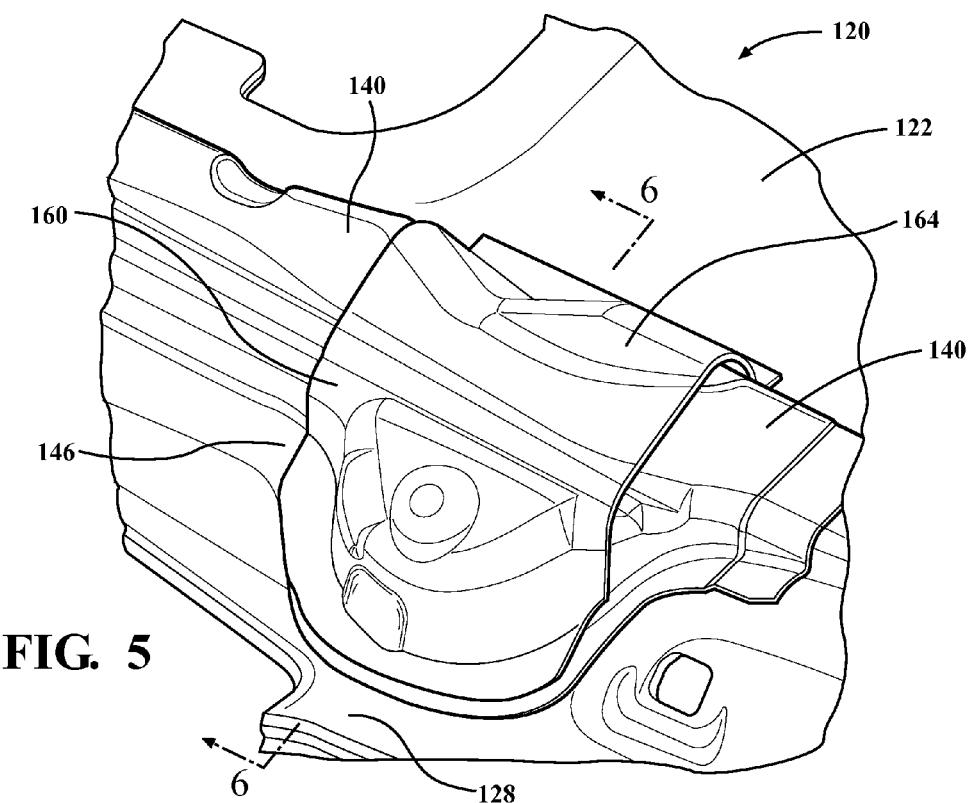
FIG. 5 shows a perspective view of a portion of an outer side of a headliner assembly with added protection shield.
Figure 6:
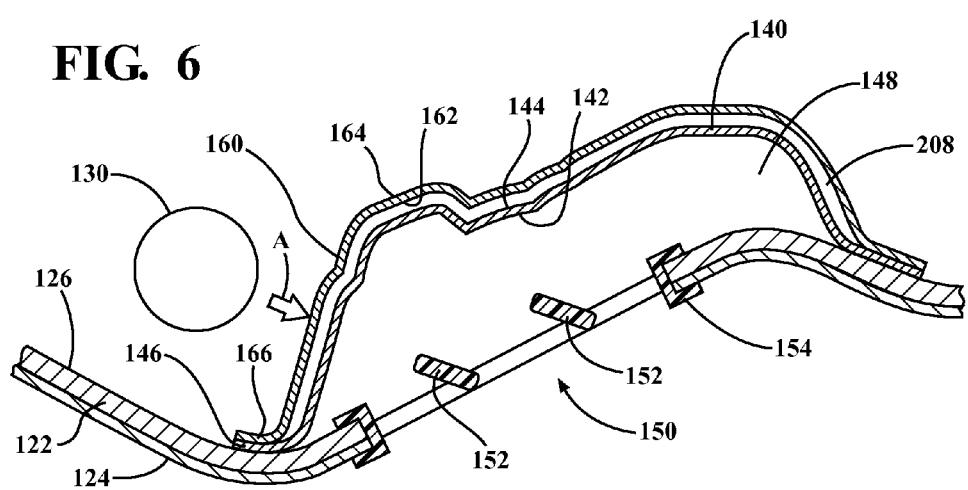
FIG. 6 shows a cross sectional view of the headliner assembly of FIG. 5 along view 6-6 with a side curtain airbag in a folded condition.

FIG. 5 depicts a portion of headliner assembly 120 with a protection shield 160. In some embodiments, shield 160 may be attached to headliner 122 or components within headliner assembly 120 to protect certain areas from forces arising from airbag 130 deployment. For example, shield 160 may be disposed over a portion of duct 140 as shown in FIGS. 5 and 6. Shield 160 may include inner shield surface 162 and outer shield surface 164. Shield 160 may also include shield flange 166.

In some embodiments, shield 160 may be shaped to cover a portion of a vehicle component. For example, shield 160 may be shaped to match the contours of duct 140 as shown in FIGS. 5 and 6. Inner shield surface 162 may face and substantially match the shape of outer duct surface 144. In some embodiments, inner shield surface 162 may be attached to outer duct surface 144. For example, the inner shield surface 162 of shield flange 166 may be attached to the outer duct surface 144 of duct flange 146 to secure shield 160 to headliner assembly 120. Thus, shield 160 may be attached such that a portion of the inner shield surface 162 abuts a portion of outer duct surface 144. Shield 160 may be configured such that gap 208 may be created between the inner shield surface 162 and outer duct surface 144. Gap 208 may allow for shield 160 to be attached to headliner assembly 120 with slight variations in duct 140 dimensions. In other embodiments, shield flange 166 may be attached directly to headliner 122. Shield 160 may be attached to duct 140 or headliner 122 using a variety of methods, such as the application of adhesives or mechanical fasteners.

Shield 160 may generally have a uniform thickness as shown in FIG. 6, or shield 160 may have portions with varying thicknesses. For example, the portion of shield 160 closest to airbag 130 may have greater thickness than other portions of shield 160 to increase the strength of shield 160 near airbag 130.

Shield 160 may be configured to withstand airbag force A without substantially breaking or deforming. For example, shield 160 may transfer force A through shield 160 and into headliner 122 rather than allowing the force to cause duct 140 to deform or break. This may prevent or reduce damage to duct 140 and may prevent vent 150 from damaging or being displaced upon airbag 130 deployment. Airbag 130 may be deployed without deforming duct 140 and causing components of vent 150 such as vanes 152 from becoming projectiles within interior 110 of vehicle 100. Shield 160 may also be configured to prevent damage to other sensitive components, such as electronics, safety features, and lights. In some embodiments, shield 160 may also provide the benefit of directing airbag 130 in a certain direction upon deployment such as through or around headliner 122.

Shield 160 may be made out of a variety of natural and synthetic materials. For example, shield 160 may be constructed out of a polycarbonate thermoplastic polymer. Shield 160 may be configured to be substantially rigid where shield 160 may resist bending, flexing, or being forced out of a predetermined shape.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle headliner assembly, comprising:
    a headliner having a first side and a second side;
    an air duct having an inner duct surface and outer duct surface, wherein a portion of the inner duct surface is attached to the second side of the headliner defining an air duct cavity between in the inner duct surface and headliner;
    a protection shield having an inner surface and outer surface, a portion of the inner surface of the protection shield is attached in abutment to a portion of the outer duct surface of the air duct; and
    an airbag, the protection shield being positioned between the airbag and the air duct.

2. The headliner assembly of claim 1, further comprising an air vent attached to an aperture in the headliner.

3. The headliner assembly of claim 2, wherein the air vent is located in a portion of the headliner vertically below the air duct and protection shield.

4. The headliner assembly of claim 1, wherein the airbag is a side curtain airbag positioned proximate to an outside edge of the headliner.

5. The headliner assembly of claim 1, wherein the protection shield is comprised of a polycarbonate polymer.

6. The headliner assembly of claim 1, wherein the inner surface of the shield matches substantially the same shape as the outer surface of the air duct.

7. The headliner assembly of claim 1, wherein the protection shield further comprises a shield flange located at a shield edge configured to attach in abutment to a portion of an outer surface of the air duct.

8. The headliner assembly of claim 7, further comprising a gap between the protection shield and air duct.

9. A vehicle headliner assembly, comprising:
a headliner having a first side and a second side;
at least one air duct having an inner duct surface and outer duct surface, wherein a portion of the inner duct surface is attached to the second side of the headliner defining an air duct cavity between the inner duct surface and headliner;
a protection shield having an inner surface and outer surface, wherein a portion of the inner surface of the protection shield is attached in abutment to the outer duct surface of the air duct and the inner surface of the protection shield is formed in substantially the same shape as the outer duct surface; and
a side curtain airbag, the protection shield being positioned between the airbag and the air duct cavity.

10. The headliner assembly of claim 9, wherein the protection shield further comprises a shield flange located at a shield edge configured to attach in abutment to a portion of an outer surface of the air duct.

11. The headliner assembly of claim 9, further comprising a gap between the protection shield and air duct.

* * * * *